United States Patent
Son

(10) Patent No.: US 8,037,741 B2
(45) Date of Patent: Oct. 18, 2011

(54) METHOD AND APPARATUS FOR MEASURING REDUCTION OF GREENHOUSE GAS BY IDLING STOP

(75) Inventor: Myunghee Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 158 days.

(21) Appl. No.: 12/631,945

(22) Filed: Dec. 7, 2009

(65) Prior Publication Data

US 2010/0147059 A1   Jun. 17, 2010

(30) Foreign Application Priority Data

Dec. 16, 2008   (KR) .................. 10-2008-0127986

(51) Int. Cl.
   *G01M 15/00* (2006.01)
(52) U.S. Cl. ................................................. 73/114.52
(58) Field of Classification Search ............... 73/114.52, 73/114.53, 114.71
See application file for complete search history.

(56) References Cited

U.S. PATENT DOCUMENTS

| | | | |
|---|---|---|---|
| 4,286,683 A * | 9/1981 | Zeigner et al. | 180/54.1 |
| 6,370,472 B1 * | 4/2002 | Fosseen | 701/102 |
| 6,694,806 B2 * | 2/2004 | Kumagai et al. | 73/114.52 |
| 6,845,314 B2 * | 1/2005 | Fosseen | 701/114 |
| 7,130,766 B2 * | 10/2006 | Tanase | 702/182 |
| 7,454,284 B2 * | 11/2008 | Fosseen | 701/104 |
| 7,532,974 B2 * | 5/2009 | Sato et al. | 701/123 |
| 7,908,911 B2 * | 3/2011 | Renner et al. | 73/114.52 |
| 2002/0056314 A1 * | 5/2002 | Kumagai et al. | 73/116 |
| 2005/0143876 A1 * | 6/2005 | Tanase | 701/22 |
| 2006/0089781 A1 * | 4/2006 | Sato et al. | 701/103 |
| 2008/0295586 A1 * | 12/2008 | Fosseen | 73/114.14 |

FOREIGN PATENT DOCUMENTS

| | | |
|---|---|---|
| JP | 2002-161784 | 6/2002 |
| KR | 10-0245875 | 12/1999 |

* cited by examiner

*Primary Examiner* — Freddie Kirkland, III
(74) *Attorney, Agent, or Firm* — Staas & Halsey LLP

(57) ABSTRACT

Provided are a method and an apparatus that make is possible to measure the amount of greenhouse gas reduced for the stop time of an engine stopped while a vehicle idles. A first amount of fuel consumed in an engine is measured before the engine of a vehicle idling stops. A second amount of fuel consumed for restarting the engine, which is stopped, by idling of the vehicle is measured. Exhaust reduction of greenhouse gas is calculated from idle stop of the vehicle to engine restart, on the basis of the first and second amount of fuel consumed and an engine stop-continued time from an ECU.

16 Claims, 2 Drawing Sheets

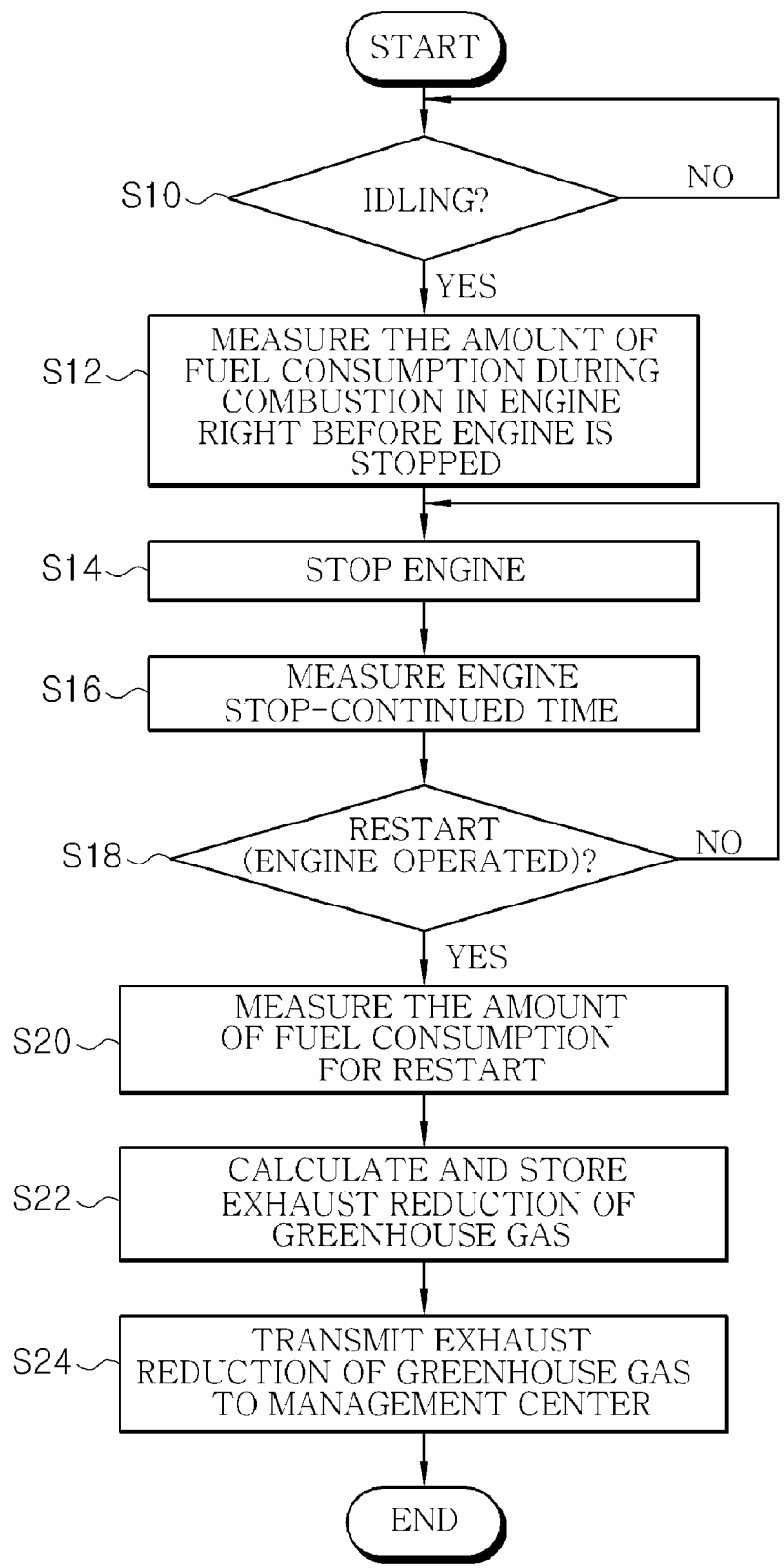

METHOD AND APPARATUS FOR MEASURING REDUCTION OF GREENHOUSE GAS BY IDLING STOP

RELATED APPLICATIONS

The present application claims priority to Korean Patent Application Serial Number 10-2008-0127986, filed on Dec. 16, 2008, the entirety of which is hereby incorporated by reference.

BACKGROUND OF THE INVENTION

1. Field of the Invention

The present invention relates to a method and apparatus for measuring reduction of greenhouse gas in the transportation field, in detail, a method and apparatus for making it possible to measure the amount of greenhouse gas that is not exhausted in idling stop of a vehicle.

2. Description of the Related Art

A gas, which contributes to the greenhouse effect, of various gases in the atmosphere is called greenhouse gas. The greenhouse gases are carbon dioxide, methane, nitrous oxide, Freon, and ozone etc. Although the moisture is the largest cause for natural greenhouse effect, carbon dioxide is typical greenhouse gas causing global warming.

As global warming has rapidly spread since the later half of the 20th century, unusual climate, such as localized heavy rain, droughts, and typhoons, have rapidly increased. If the present level of contamination continues, it is expected that the exhaust amount of greenhouse gases throughout the world will reach a level that will seriously threaten mankind and the ecosystem in the near future.

Accordingly, international cooperation for reducing the exhaust amount of the greenhouse gases has been established to cope with global warming due to the greenhouse gases.

Presently, a variety of efforts are being made in the transportation field to reduce the greenhouse gases. In particular, much effort has been made in improving fuel efficiency, as a part of the efforts.

However, research on a technology for accurately detecting and analyzing the reduction of the greenhouse gas resulting from the improvement of the fuel efficiency are not sufficient yet.

SUMMARY OF THE INVENTION

The present invention addresses the problem described above and it is an object of the invention to provide a method and an apparatus that make is possible to measure the amount of greenhouse gas reduced for the stop time of an engine stopped while a vehicle idles.

In order to achieve the objects of the present invention, a method of measuring reduction of greenhouse gas by idling stop according to a preferred embodiment of the present invention includes: measuring a first amount of fuel consumed in an engine before the engine of a vehicle, which is in idling state, stops, by a fuel consumption amount measurer; measuring a second amount of fuel consumed for restarting the engine, which is stopped, by the fuel consumption amount measurer; and calculating exhaust reduction of greenhouse gas by a greenhouse gas exhaust reduction calculator from idle stop of the vehicle to engine restart, on the basis of the first and second amount of fuel consumed and an engine stop-continued time from the outside.

The measuring of the first amount of fuel consumed measures the first amount of fuel consumed on the basis of sensing information from a sensor that senses the flow rate of fuel that flows into the engine right before the engine is stopped.

The measuring of the first amount of fuel consumed measures the first amount of fuel consumed on the basis of an injector-driven time from when the vehicle idles to when the engine is stopped.

The measuring of the second amount of fuel consumed measures the second amount of fuel consumed on the basis of sensing information of a sensor that senses flow rate of fuel that flows into the engine to restart the engine.

The measuring of the second amount of fuel consumed measures the second amount of fuel consumed on the basis of an injector-driven time until the stopped engine is restarted.

The calculating of the exhaust reduction of greenhouse gas calculates the exhaust reduction of greenhouse gas on the basis of the following Formula 1, $$\text{exhaust reduction of greenhouse gas by idling stop} = a \times (\text{amount of fuel consumed during idling} - \text{amount of consumed fuel exhausted as a result of idling stop} - \text{amount of fuel consumed for engine restart}) \quad \text{(Formula 1)}$$

(In Formula 1, the amount of fuel consumed in idling is calculated by multiplying the first amount of fuel consumed by the engine stop-continued time, the amount of fuel consumed exhausted as result of idling stop is "0 (zero)", the amount of fuel consumed for engine restart is the second amount of fuel consumed, and the 'a' is an equivalent constant that is determined by the types of fuel used in the vehicle).

The method of measuring reduction of greenhouse gas by idling stop may further include transmitting the exhaust reduction of greenhouse gas calculated in the calculating of exhaust reduction of greenhouse gas to a management center, by a greenhouse gas exhaust reduction transmitter.

The method of measuring reduction of greenhouse gas by idling stop may further include storing the calculated exhaust reduction of greenhouse gas in a storage, by the greenhouse gas exhaust reduction calculator.

On the other hand, an apparatus for measuring reduction of greenhouse gas by idling stop according to a preferred embodiment of the present invention includes: a fuel consumption amount measurer that measures a first amount of fuel consumed in an engine before the engine of a vehicle, which is in idling state, stops, and a second amount of fuel consumed for restarting the engine, which is stopped; and a greenhouse gas exhaust reduction calculator that calculates exhaust reduction of greenhouse gas from idle stop of the vehicle to engine restart, on the basis of the first and second amount of fuel consumed and an engine stop-continued time from the outside.

The fuel consumption amount measurer measures the first amount of fuel consumed on the basis of sensing information from a sensor that senses the flow rate of fuel that flows into the engine right before the engine is stopped.

The fuel consumption amount measurer measures the first amount of fuel consumed on the basis of an injector-driven time from when the vehicle idles to when the engine is stopped.

The fuel consumption amount measurer measures the second amount of fuel consumed on the basis of sensing information of a sensor that senses flow rate of fuel that flows into the engine to restart the engine.

The fuel consumption amount measurer measures the second amount of fuel consumed on the basis of an injector-driven time until the stopped engine is restarted.

The greenhouse gas exhaust reduction calculator calculates the exhaust reduction of greenhouse gas on the basis of the following Formula 1, exhaust reduction of greenhouse gas by idling
stop=$a$×(amount of fuel consumed during idling−
amount of consumed fuel exhausted as a result of
idling stop−amount of fuel consumed for engine
restart)     (Formula 1)

(In Formula 1, the amount of fuel consumed in idling is calculated by multiplying the first amount of fuel consumed by the engine stop-continued time, the amount of fuel consumed exhausted as result of idling stop is "0 (zero)", the amount of fuel consumed for engine restart is the second amount of fuel consumed, and the 'a' is an equivalent constant that is determined by the types of fuel used in the vehicle).

The apparatus for measuring reduction of greenhouse gas by idling stop may further include a greenhouse gas exhaust reduction transmitter that transmits the exhaust reduction of greenhouse gas calculated by the greenhouse gas exhaust reduction calculator to a management center.

The apparatus for measuring reduction of greenhouse gas by idling stop may further include a storage that stores the exhaust reduction of greenhouse gas calculated by the greenhouse gas exhaust reduction calculator.

According to the present invention having the above configuration, it is possible to accurately measure and store in real time the exhaust reduction of greenhouse gas until the engine stopped is restarted while the vehicle idles, regardless of the control method of mechanical or electronic idle stop, such that it is possible to perform objective quantitative monitoring in the degree of contribution for preventing global warming in the transportation field.

BRIEF DESCRIPTION OF THE DRAWING

FIG. 2 is a flowchart illustrating a method of measuring reduction of a greenhouse gas on idling stop according to an embodiment of the present invention.

DETAILED DESCRIPTION OF THE PREFERRED EMBODIMENTS

Figure 1:
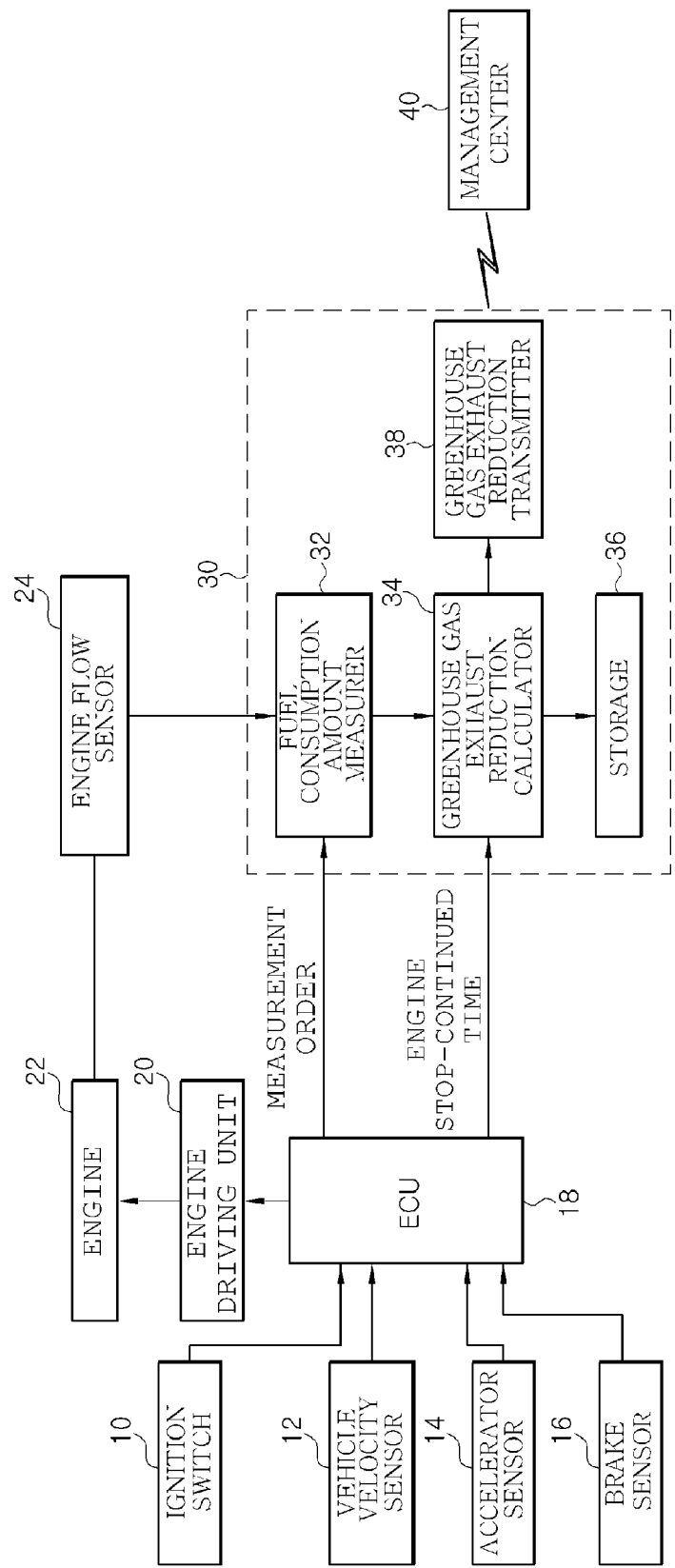
FIG. 1 is a diagram illustrating the configuration of an apparatus for measuring reduction of a greenhouse gas on idling stop according to an embodiment of the present invention.

A method and apparatus for measuring reduction of greenhouse gases by idling stop according to an embodiment of the present invention are described hereafter with reference to the accompanying drawings. The present invention is applied to all of a vehicle of which the engine is stopped by a driver turning the key when idling is generated in traveling, a vehicle equipped with a device that stops and restarts the engine when a predetermined time progresses after idling by a manual idling stop control device, and a vehicle equipped with a device that can automatically control idling stop, in order to be admitted as a CDM (Clean Development Mechanism) business by reducing the amount of greenhouse gases (mainly carbon dioxide) using idling stop. It is assumed that the vehicle described hereafter is a vehicle equipped with an automatic idling stop control device.

FIG. 1 is a diagram illustrating the configuration of an apparatus for measuring reduction of a greenhouse gas on idling stop according to an embodiment of the present invention. It is assumed that each vehicle is equipped with the apparatus for measuring reduction of a greenhouse gas on idling stop (greenhouse reduction measurement module 30) according to an embodiment of the present invention.

In FIG. 1, the following conditions should be satisfied while an ignition switch 10 is turned on to automatically stop an engine 22 when the vehicles are stopped for waiting for the traffic lights. That is, an output signal of a vehicle velocity sensor 12 should indicate "0 (zero)", an output signal of an accelerator sensor 14 should indicates that the acceleration pedal is not pressed down, and an output signal of a brake sensor 16 should indicate that the brake pedal is pressed down. When the driver removes the foot from the brake pedal and presses down the acceleration pedal, a condition of restarting the engine 22 of the stopped vehicle is achieved.

In other words, an ECU 18 determines whether the engine idles on the basis of the signals from the ignition switch 10, vehicle velocity sensor 12, accelerator sensor 14, and brake sensor 16, thereafter, automatically stops or restarts the engine 22. This method of controlling automatic idling stop is well known to those skilled in the art.

Although the ignition switch 10, vehicle velocity sensor 12, accelerator sensor 14, and brake sensor 16 are provided to determine whether the engine 22 idles in FIG. 1, it may be possible to determine whether the engine 22 idles, using an idle sensor, instead of them, for simplification of the figure and easy understanding. The idle sensor detects idling of the engine 22, and converts it into an electric signal and then outputs it. The idle sensor includes an idle switch. The idle switch is turned on when the vehicle idles. The idle switch is turned off when the stopped engine is restarted. When the idle switch is turned on, the ECU 18 can determine that the vehicle is presently stopped while idling.

Further, another configuration different from the configuration described above may be possible, for example, the ignition switch 10, vehicle velocity sensor 12, accelerator sensor 14, brake sensor 16, and the ECU 18 may be configured as one block of a device of controlling automatic idling stop.

An engine driving unit 20 drives engine 22 on the basis of a control signal from ECU 18. The engine driving unit 20 includes an injector (not shown) that injects fuel to the engine 22.

A fuel flow sensor 24 outputs information needed to measure the amount of fuel consumed at a desired time. For example, the fuel flow sensor 24 senses and outputs the flow rate of fuel flowing into the engine 22 right before the engine is stopped (substantially the present condition), when the engine of a vehicle idles. Further, the fuel flow sensor 24 senses and outputs the flow rate of fuel flowing into the engine 22 for restarting the engine 22, when the engine 22 is restarted. The configuration and the operational principle are well known and easily understood by those skilled in the art, if not specifically stated.

A fuel level sensor may be substituted for the fuel flow sensor 24. Further, an intake air detecting sensor that controls fuel injection, such as an air flow sensor or a MAP sensor, may be substituted for the fuel flow sensor 24. On the other hand, an oxygen sensor or a throttle position sensor etc. can be used. That is, the fuel flow sensor 24 is not necessary and any sensor that can output information needed for measuring the amount of fuel consumed at the measurement time can be used. The function of the fuel level sensor, air flow sensor, MAP sensor, oxygen sensor, throttle position sensor can be sufficiently understood by those skilled in the art from the known technologies, if not specifically stated.

In FIG. 1, reference numeral '30' designates a device that can measure reduction of greenhouse gases until the engine 22 is restarted after being stopped, while the vehicle idles, i.e. a greenhouse gas reduction measurement module. The greenhouse gas reduction measurement module 30 is equipped in the vehicle.

The greenhouse gas reduction measurement module 30 includes a fuel consumption amount measurer 32, a greenhouse gas exhaust reduction calculator 34, a storage 36, and a greenhouse gas exhaust reduction transmitter 38.

The fuel consumption amount measurer 32 measures the amount of fuel consumed F1 during combustion in the engine 22 right before the engine is stopped (substantially the present condition) when the vehicle idles. The fuel consumption amount measurer 32 measures the amount of fuel consumed F1 on the basis of sensing information from the fuel flow sensor 24 when receiving a measurement order (i.e. an order of measuring the amount of fuel consumed F1 in the engine 22 right before the engine is stopped) from the ECU 18. The amount of fuel consumed F1 is the first amount of fuel consumed in claims of the present invention. In this operation, the fuel consumption amount measurer 32 calculates the value of inputted fuel flow in the amount of fuel consumed corresponding to the value, using a predetermined calculation algorithm, or uses a lookup table with the value of fuel flow and information about amount of fuel consumed matched with the value. This is easily understood from technologies known in the art by those skilled in the art, if not specifically stated. Alternatively, it is possible to use the driven time of the injector. The ECU 18 can acquire an injector-driven time T1 from when determining that the vehicle idles to when stopping the engine. When the ECU 18 transmits the injector-driven time T1 to the fuel consumption amount measurer 32, the fuel consumption amount measurer 32 measures the amount of fuel consumed F1 on the basis of the injector-driven time T1. Since it is possible to consider that the amount of fuel consumed in the engine 22 is proportional to the injector-driven time, it is possible to easily acquire the amount of fuel consumed only by checking the injector-driven time. This is easily understood from technologies known in the art by those skilled in the art, if not specifically stated. Although using the sensing information of the fuel flow sensor 24 described above makes it possible to measure the amount of fuel consumed F1 at one time point (i.e. right before the engine is stopped), using the injector-driven time T1 makes it possible to measure the amount of fuel consumed F1 from when determining that the vehicle idles to when stopping the engine, such that this may be more accurate measurement. However, it will be more effective to use the sensing information of the fuel flow sensor 24 than to use the injector-driven time T1, when the time from when determining that the vehicle idles to when stopping the engine is short.

The fuel consumption amount measurer 32 measures the amount of fuel consumed F2 for restart, when the engine 22 is restarted. The fuel consumption amount measurer 32 measures the amount of fuel consumed F2 on the basis of sensing information from the fuel flow sensor 24 when receiving a measurement order (i.e. an order of measuring the amount of fuel consumed F2 for engine restart) from the ECU 18. Similarly, in this operation, the fuel consumption amount measurer 32 measures the amount of fuel consumed F2, using a predetermined calculation algorithm or a lookup table as described above. The amount of fuel consumed F2 is the second amount of fuel consumed in claims of the present invention. Alternatively, it is possible to use an injector-driven time. Fuel is supplied to the engine 22 through the injector to restart the stopped engine 22. Accordingly, the ECU 18 can acquire an injector-driven time T2 until the engine 22 is restarted. When the ECU 18 transmits the injector-driven time T2 to the fuel consumption amount measurer 32, the fuel consumption amount measurer 32 can measure the amount of fuel consumed for restarting the engine 22 on the basis of the injector-driven time T2. Since it is possible to consider that the amount of fuel consumed in the engine 22 is proportional to the injector-driven time, it is possible to easily acquire the amount of fuel consumed only by checking the injector-driven time. This is easily understood from technologies known in the art by those skilled in the art, if not specifically stated.

The greenhouse gas exhaust reduction calculator 34 calculates exhaust reduction of greenhouse gas by idling stop of a corresponding vehicle, using the following Formula 1, on the basis of information from the fuel consumption amount measurer 32 and an engine stop-continued time $\Delta T$ from the ECU 18, exhaust reduction of greenhouse gas by idling stop=$a \times$(amount of fuel consumed during idling−amount of fuel consumed exhausted as result of idling stop−amount of fuel consumed for engine restart). (Formula 1)

In Formula 1, the amount of fuel consumed in idling is calculated by multiplying the amount of fuel consumed F1 right before the engine is stopped during idling by the engine stop-continued time $\Delta T$.

In Formula 1, the amount of fuel consumed exhausted as result of idling stop is "0 (zero)".

In Formula 1, the amount of fuel consumed for engine restart is the amount F2 of fuel consumption for restarting the engine 22 described above.

The amount of fuel consumed of a vehicle equipped with an internal combustion engine is substantially equal to the amount of greenhouse gas (e.g. carbon dioxide) generated by combustion of the fuel. The constant 'a' in Formula 1, which is a part making the exhaust reduction of greenhouse gas equivalent to the amount of fuel consumed by combustion, depends on the types of fuel. That is, even in combustion of fuel for the same time, the combustion amount of fuel is different from the types of fuel; therefore, an equivalent constant 'a' is applied in accordance with the types of fuel used in the vehicle.

The amount of fuel consumed F1, F2 in Formula 1 can be considered as values acquired by using the sensing information from the fuel flow sensor 24; however, if necessary, the consumed amount F1 may be a value acquired by using the injector-driven time T1 and the amount of fuel consumed F2 may be a value acquired by using the injector-driven time T2.

The greenhouse gas exhaust reduction calculator 34 stores the calculated exhaust reduction of greenhouse gas (i.e. the exhaust reduction of greenhouse gas by idling stop) in the storage 36 and transmits it to the greenhouse gas exhaust reduction transmitter 38.

The storage 36 may be a memory that instantly stores information (i.e. the calculated exhaust reduction of greenhouse) from the greenhouse gas exhaust reduction calculator 34 or a memory that can stores it for a long period of time.

The greenhouse gas exhaust reduction transmitter 38 converts the information (i.e. the calculated exhaust reduction of greenhouse) from the greenhouse gas exhaust reduction calculator 34 into a transmissible type and then transmits it to a server (not shown) of a management center 40. FIG. 1 illustrates when information is wirelessly transmitted/received between the greenhouse gas exhaust reduction transmitter 38 and the management center 40. It should be construed that the wireless transmission/reception includes a method using a mobile communication network. If necessary, the information can be transmitted/received between the greenhouse gas exhaust reduction transmitter 38 and the management center 40 by another method.

The management center 40 accumulates the information (i.e. the calculated exhaust reduction of greenhouse) from the greenhouse gas exhaust reduction transmitter 38. The management center 40 analyzes the contribution degree of the transportation field in relation to global warming, on the basis of the accumulated information.

A measuring reduction of greenhouse gas on the idling stop according to an embodiment of the present invention is described with reference to the flowchart shown in FIG. 2.

First, the ECU 18 determines whether a vehicle is in an idle state with the engine started (S10), in which determining that the vehicle is stopped in the idle stage at present time is performed as described above.

In S10, when it is determined that the vehicle is stopped in the idle stage at present time ("Yes" in S10), the ECU 18 stops the engine 22 by controlling the engine driving unit 20. In this operation, the ECU 18 transmits an order of measuring the amount of fuel consumed F1 during combustion in the engine 22, right before the engine is stopped while the vehicle is in the idle state, to the fuel consumption amount measurer 32. Accordingly, the fuel consumption amount measurer 32 measures the amount of fuel consumed F1 on the basis of information from the fuel flow sensor 24 at that time point (S12). Alternatively, it is also possible to measure the amount of fuel consumed F1, using the injector-driven time T1.

The fuel consumption amount measurer 32 transmits the measured amount of fuel consumed F1 to the greenhouse gas exhaust reduction calculator 34.

When the engine 22 is stopped by the ECU 18 (S14), the ECU 18 measures the time while the engine 22 is stopped (i.e. engine stop-continued time) (S16).

The ECU 18 checks whether the stopped engine 22 is restarted (i.e. the engine is operated again) on the basis of a signal from the ignition switch 10, vehicle velocity sensor 12, accelerator sensor 14, and brake sensor 16 (S18). When it is checked that the engine is not restarted ("No" in S18), the ECU 18 continues measuring the engine stop-continued time.

If the engine is restarted ("Yes" in S18), the ECU 18 transmits an order of measuring the amount F2 of fuel consumption for restart to the fuel consumption amount measurer 32 and transmits the measured engine stop-continued time ΔT to the greenhouse gas exhaust reduction calculator 34. Accordingly, the fuel consumption amount measurer 32 measures the amount of fuel consumed F2 from that time point on the basis of sensing information from the fuel flow sensor 24 (S20). Alternatively, it is possible to measure the amount of fuel consumed F2, using the injector-driven time T2.

The fuel consumption amount measurer 32 transmits the measured amount of fuel consumed F2 to the greenhouse gas exhaust reduction calculator 34.

Further, the greenhouse gas exhaust reduction calculator 34 calculates the exhaust reduction of greenhouse gas, using Formula 1, on the basis of the inputted information, and stores the calculated exhaust reduction of greenhouse gas in the storage 36 (S22).

The greenhouse gas exhaust reduction calculator 34 transmits the stored exhaust reduction greenhouse gas to the greenhouse gas exhaust reduction transmitter 38, and the greenhouse gas exhaust reduction transmitter 38 converts the information (i.e. the calculated exhaust reduction of greenhouse gas) from the greenhouse gas exhaust reduction calculator 34 into a transmissible type, and then transmits it to the server (not shown) of the management center 40 (S24).

Accordingly, the management center 40 accumulates the information (i.e. the calculated exhaust reduction of greenhouse gas) from the greenhouse gas exhaust reduction calculator 34. The management center 40 analyzes the contribution degree of the transportation field in relation to global warming, on the basis of the accumulated information.

According to the above process, it is possible to perform objective quantitative analysis for the exhaust reduction of greenhouse gas while stopping and restarting the engine to stop idling, after determining the idle state of the vehicle.

It should be understood that the present invention is not limited to the above embodiments and can be modified and changed in various ways without departing from the scope of the present invention and the modified and change aspects are included in the following claims.

What is claimed is:

1. A method of measuring reduction of greenhouse gas by idling stop, comprising:
   measuring a first amount of fuel consumed in an engine before the engine of a vehicle, which is in idling state, stops, by a fuel consumption amount measurer;
   measuring a second amount of fuel consumed for restarting the engine, which is stopped, by the fuel consumption amount measurer; and
   calculating exhaust reduction of greenhouse gas by a greenhouse gas exhaust reduction calculator from idle stop of the vehicle to engine restart, on the basis of the first and second amount of fuel consumed and an engine stop-continued time from the outside.

2. The method of measuring reduction of greenhouse gas by idling stop according to claim 1, wherein the measuring of the first amount of fuel consumed measures the first amount of fuel consumed on the basis of sensing information from a sensor that senses the flow rate of fuel that flows into the engine right before the engine is stopped.

3. The method of measuring reduction of greenhouse gas by idling stop according to claim 1, wherein the measuring of the first amount of fuel consumed measures the first amount of fuel consumed on the basis of an injector-driven time from when the vehicle idles to when the engine is stopped.

4. The method of measuring reduction of greenhouse gas by idling stop according to claim 1, wherein the measuring of the second amount of fuel consumed measures the second amount of fuel consumed on the basis of sensing information of a sensor that senses flow rate of fuel that flows into the engine to restart the engine.

5. The method of measuring reduction of greenhouse gas by idling stop according to claim 1, wherein the measuring of the second amount of fuel consumed measures the second amount of fuel consumed on the basis of an injector-driven time until the stopped engine is restarted.

6. The method of measuring reduction of greenhouse gas by idling stop according to claim 1, wherein the calculating the exhaust reduction of greenhouse gas calculates the exhaust reduction of greenhouse gas on the basis of the following Formula 1, exhaust reduction of greenhouse gas by idling stop=$a$×(amount of fuel consumed during idling−amount of consumed fuel exhausted as a result of idling stop−amount of fuel consumed for engine restart)     (Formula 1)

(In Formula 1, the amount of fuel consumed in idling is calculated by multiplying the first amount of fuel consumed by the engine stop-continued time, the amount of consumed fuel exhausted as result of idling stop is "0 (zero)", the amount of fuel consumed for engine restart is the second amount of fuel consumed, and the 'a' is an equivalent constant that is determined by the types of fuel used in the vehicle).

7. The method of measuring reduction of greenhouse gas by idling stop according to claim 1, further comprising:
   transmitting the exhaust reduction of greenhouse gas calculated in the calculating of exhaust reduction of greenhouse gas to a management center, by a greenhouse gas exhaust reduction transmitter.

8. The method of measuring reduction of greenhouse gas by idling stop according to claim 1, further comprising:
storing the calculated exhaust reduction of greenhouse gas in a storage, by the greenhouse gas exhaust reduction calculator.

9. An apparatus for measuring reduction of greenhouse gas by idling stop, comprising:
a fuel consumption amount measurer that measures a first amount of fuel consumed in an engine before the engine of a vehicle, which is in idling state, stops, and a second amount of fuel consumed for restarting the engine, which is stopped; and
a greenhouse gas exhaust reduction calculator that calculates exhaust reduction of greenhouse gas from idle stop of the vehicle to engine restart, on the basis of the first and second amount of fuel consumed and an engine stop-continued time from the outside.

10. The apparatus for measuring reduction of greenhouse gas by idling stop according to claim 9, wherein the fuel consumption amount measurer measures the first amount of fuel consumed on the basis of sensing information from a sensor that senses the flow rate of fuel that flows into the engine right before the engine is stopped.

11. The apparatus for measuring reduction of greenhouse gas by idling stop according to claim 9, wherein the fuel consumption amount measurer measures the first amount of fuel consumed on the basis of an injector-driven time from when the vehicle idles to when the engine is stopped.

12. The apparatus for measuring reduction of greenhouse gas by idling stop according to claim 9, wherein the fuel consumption amount measurer measures the second amount of fuel consumed on the basis of sensing information of a sensor that senses flow rate of fuel that flows into the engine to restart the engine.

13. The apparatus for measuring reduction of greenhouse gas by idling stop according to claim 9, wherein the fuel consumption amount measurer measures the second amount of fuel consumed on the basis of an injector-driven time until the stopped engine is restarted.

14. The apparatus for measuring reduction of greenhouse gas by idling stop according to claim 9, wherein the greenhouse gas exhaust reduction calculator calculates the exhaust reduction of greenhouse gas on the basis of the following Formula 1, $$\text{exhaust reduction of greenhouse gas by idling stop} = a \times (\text{amount of fuel consumed during idling} - \text{amount of consumed fuel exhausted as a result of idling stop} - \text{amount of fuel consumed for engine restart}) \quad \text{(Formula 1)}$$

(In Formula 1, the amount of fuel consumed in idling is calculated by multiplying the first amount of fuel consumed by the engine stop-continued time, the amount of consumed fuel exhausted as result of idling stop is "0 (zero)", the amount of fuel consumed for engine restart is the second amount of fuel consumed, and the 'a' is an equivalent constant that is determined by the types of fuel used in the vehicle).

15. The apparatus for measuring reduction of greenhouse gas by idling stop according to claim 9, further comprising:
a greenhouse gas exhaust reduction transmitter that transmits the exhaust reduction of greenhouse gas calculated by the greenhouse gas exhaust reduction calculator to a management center.

16. The apparatus for measuring reduction of greenhouse gas by idling stop according to claim 9, further comprising:
a storage that stores the exhaust reduction of greenhouse gas calculated by the greenhouse gas exhaust reduction calculator.

* * * * *